Dec. 31, 1940.   R. H. LAWSON   2,227,356
METHOD OF AND MEANS FOR CHANGING THE SPEED OF ELECTRIC
MOTORS FOR VARIOUS PURPOSES
Filed July 1, 1939   3 Sheets-Sheet 1
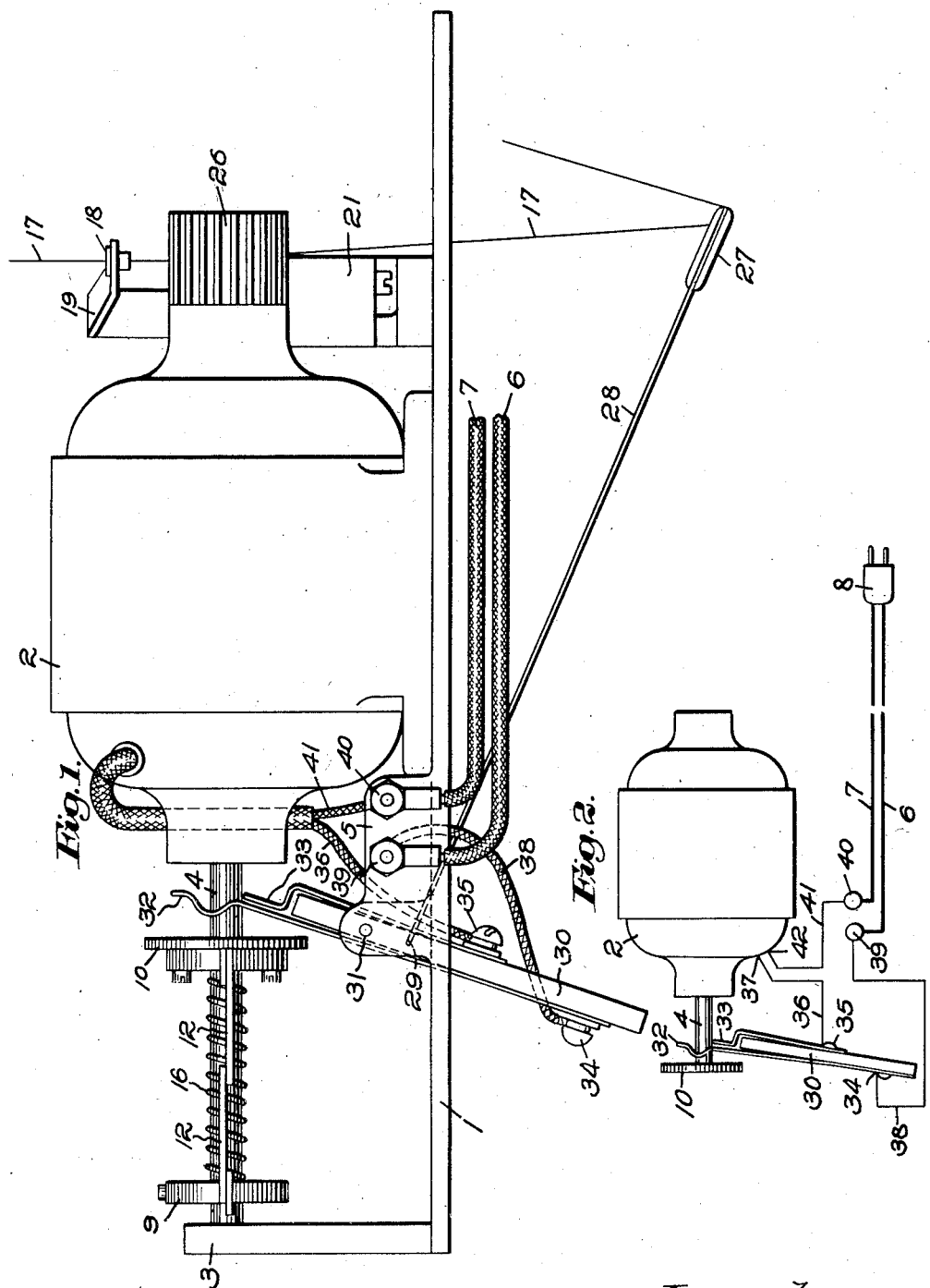
Inventor:
Robert H. Lawson.
by Emery, Booth, Townsend, Miller and Lauritsen
Attys.

Dec. 31, 1940.   R. H. LAWSON   2,227,356
METHOD OF AND MEANS FOR CHANGING THE SPEED OF ELECTRIC
MOTORS FOR VARIOUS PURPOSES
Filed July 1, 1939   3 Sheets-Sheet 2
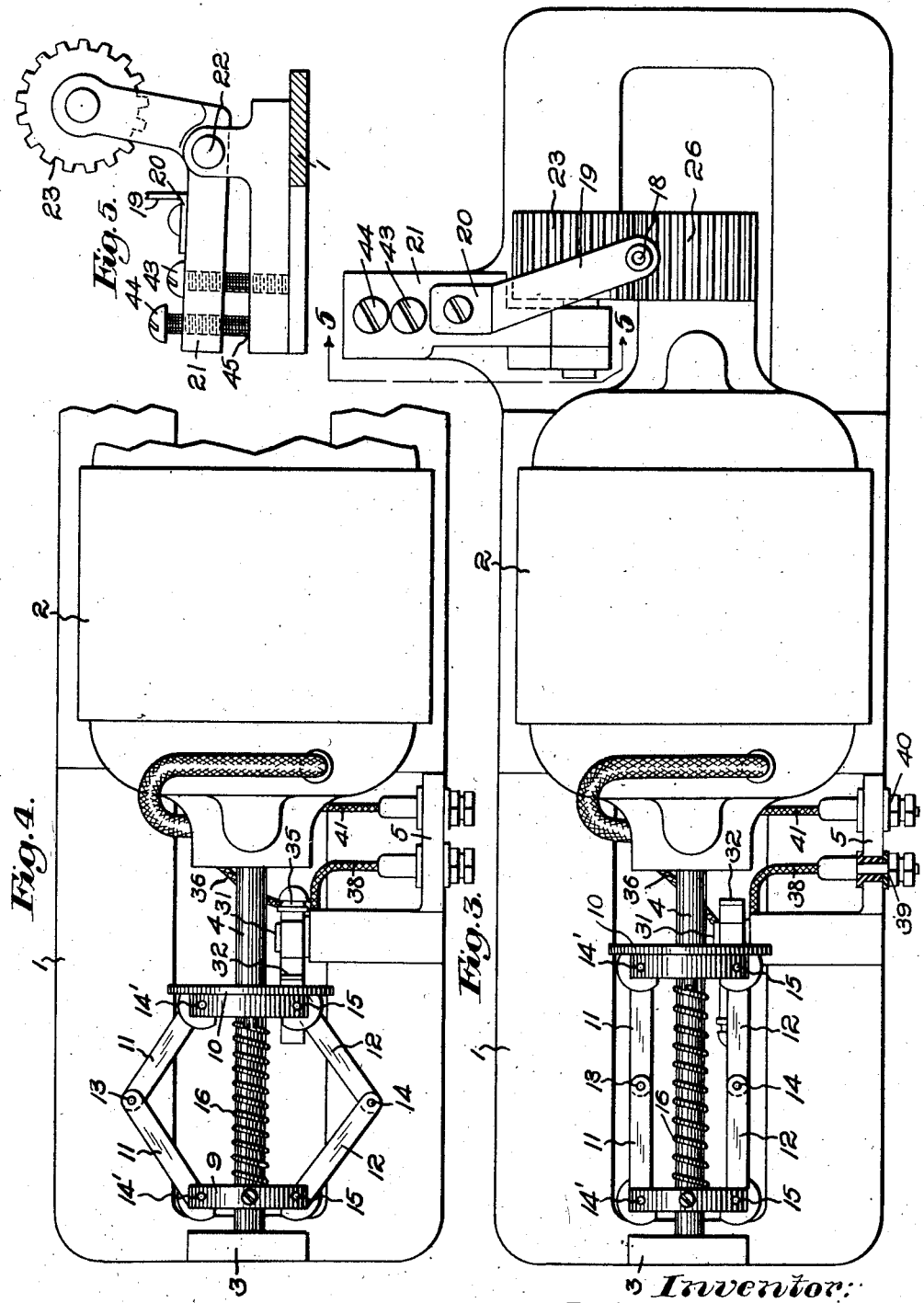
Inventor:
Robert H. Lawson,
Attys Dec. 31, 1940.   R. H. LAWSON   2,227,356
METHOD OF AND MEANS FOR CHANGING THE SPEED OF ELECTRIC
MOTORS FOR VARIOUS PURPOSES
Filed July 1, 1939   3 Sheets-Sheet 3
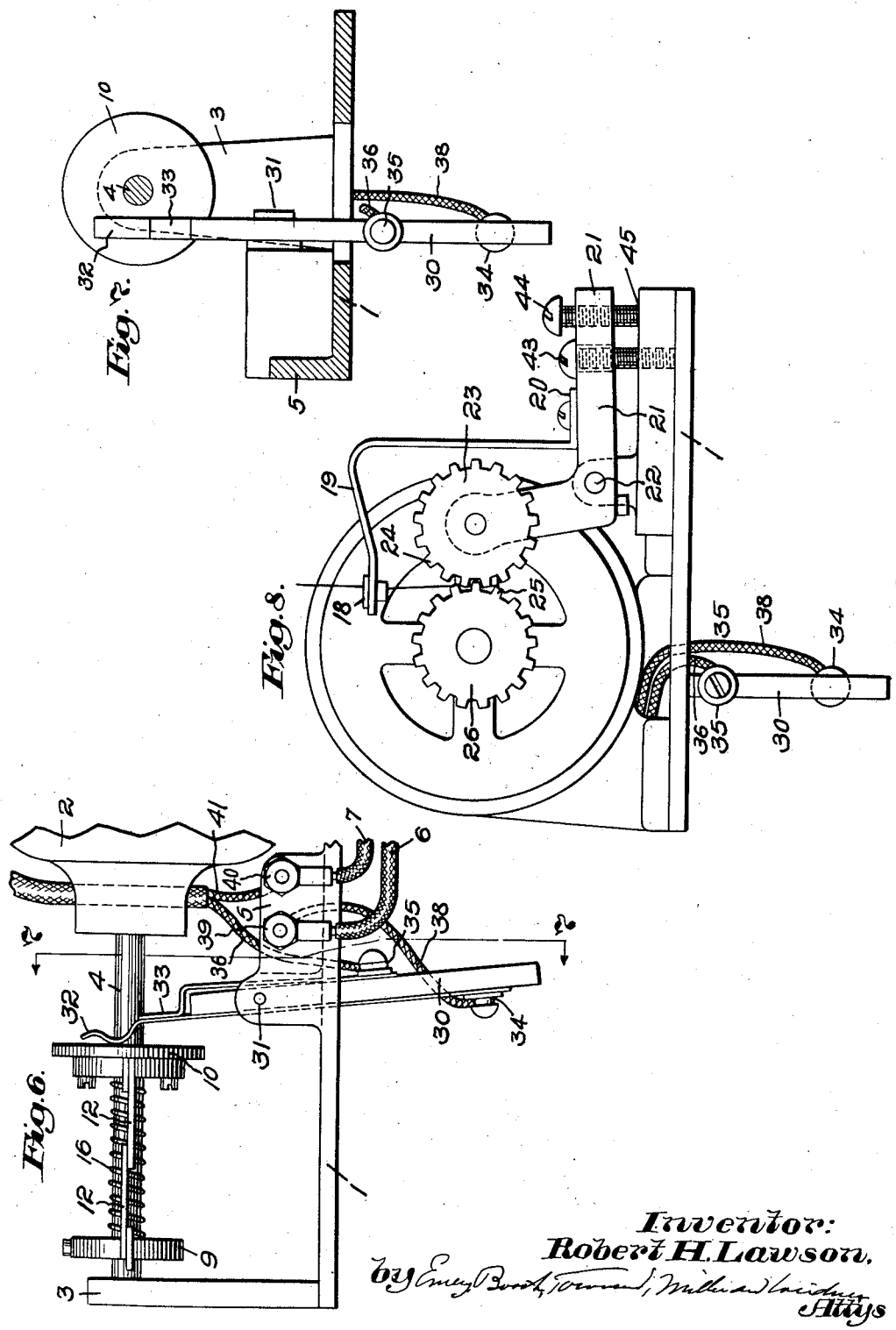
Inventor:
Robert H. Lawson, Patented Dec. 31, 1940

2,227,356

UNITED STATES PATENT OFFICE 2,227,356

METHOD OF AND MEANS FOR CHANGING THE SPEED OF ELECTRIC MOTORS FOR VARIOUS PURPOSES

Robert H. Lawson, Pawtucket, R. I., assignor to Scott & Williams, Incorporated, Laconia, N. H., a corporation of Massachusetts Application July 1, 1939, Serial No. 282,540

18 Claims. (Cl. 242—45)

This invention relates to a method of and means for changing the speed of electric motors for various purposes, as, for example, to control the feeding of material in strand-like form. While my invention is susceptible of use in many different relations, I will, for the purpose of making a concrete disclosure of one important use to which the invention may be applied, illustrate its application to the feeding of material in strand-like form, which use is merely by way of example, but which is herein also claimed as one aspect of my invention.

My invention is particularly applicable in situations where it is desired to vary the speed of an electric motor through the application of what may be very slight physical force, one example whereof may be the delivery of yarn or thread, any change in the tension of the yarn or thread so acting upon the mechanism of my invention as to control the speed of the motor.

Before referring to the single example selected as an explanation of the principle of my invention, I state by way of general explanation that the slight physical force—whether it be a change in the tension of the yarn or thread, the movement of a bi-metal spring which acts differently at different temperatures, the movement of a helical pressure spring, the movement of a magnet, or some other action involving a relatively slight physical force—is employed to position an electric switch of some suitable type, which switch when positioned will be acted upon by a mechanism to throw the switch on or off depending on the speed of the motor. Preferably the switch is positioned so as to be brought into contact with a governor of the electric motor, which governor may act as an abutment if stationary, so as to close the switch and permit the flow of current to the motor. The motor will thereupon start with slight speed or power and as the speed of the motor increases, the governor will move under centrifugal action away from the switch, whereupon the switch may be repositioned by following the governor, and the motor may consequently continue to work up to or toward full speed, or if the external force applied becomes temporarily less, the speed of the motor correspondingly decreases.

Without further detailed statement at this point, I will refer to the single embodiment of means or mechanism constituting a single use of the invention selected by way of convenient example. It is to be understood, however, that the invention is capable of use in many different ways.

In the drawings:

Fig. 1 is a side elevation of mechanism embodying an application of my invention, the electric motor being stationary or at rest;

Fig. 2 is a similar view but on a smaller scale and showing more completely the electric circuit for the electric motor, which is stationary or at rest in said figure;

Fig. 3 is a plan view of the construction shown in Fig. 1, the motor being stationary or at rest;

Fig. 4 is a plan view of the construction shown in Fig. 1 with the electric motor running;

Fig. 5 is a detail on the broken lines 5—5 of Fig. 3 looking toward the right in said figure to show the means for adjusting the position of the strand feeding gears;

Fig. 6 is a side elevation of a part only of the mechanism shown in Fig. 4, with the electric motor running;

Fig. 7 is a detail in section on the broken line 7—7 of Fig. 6 looking toward the left in said figure to show the lever carrying the spring contact elements and the disk of the governor against which they are forced into circuit closing position, so as to start the electric motor; and Fig. 8 is an end elevation of the construction shown in Figs. 1 or 3.

The invention particularly relates to the changing or controlling of the speed of an electric motor for various purposes. Inasmuch as the feeding of strand-like material for textile purposes affords a convenient and notable instance of variations in movements with the presence of slight physical force, I have chosen to illustrate the invention as used with the feeding of yarn or thread that is to be wound into package form, whether cylindrical or tapered or otherwise, or with the feeding of thread or yarn to a knitting machine, either circular or straight, and for any purpose. In either of these cases, namely, in winding or in knitting, there are almost constant and inevitable slight changes in the tension of the yarn or thread, which changes in tension result in the movement of a member such as a guide arm connected to an electrical switch so that the movement of the guide arm positions the switch, as will be fully described, with the result that current is supplied to the electric motor and the speed thereof is controlled.

I will therefore proceed, without thereby limiting the scope of my invention, to explain the single application of the use of my invention which I have selected as an example.

Referring more particularly to the drawings, where a single example of a use of the invention is represented, I have in the several figures indicated a base 1 of metal or other suitable material, which is of sufficient weight and strength to support the operating parts. Suitably secured to the base 1 is an electric motor 2, which may be adapted either for alternating or direct current. It may be of any suitable type, as, for example, a series or universal or capacity type, and may be any motor within the range of the switch hereinafter described. For the usual purposes of the invention, the electric motor may be of small size for developing the necessary power, which may be one-eighth or one-quarter horse power or the like. Suitable uprights or standards are provided upon the base 1, as, for example, the end upright 3 in which the shaft 4 of the motor is mounted for rotation. Also mounted upon base 1 is an upturned part or hub 5 receiving the wires 6, 7, which may be of usual character and are suitably secured to a plug 8 that is adapted to be plugged into any suitable source of power furnished on the premises.

Fast upon the shaft 4 of the motor is a disk or large collar 9 so as to rotate with the shaft 4. Loosely mounted on said shaft 4 is a disk 10, but with capacity to rotate thereon with the collar 9 and also to move axially thereon. The two disks 9, 10 are operatively connected by a series of pairs of links, shown as two pairs in number, at 11, 11, 12, 12. The two links 11 are pivoted at 13, and the two links 12 are pivoted together at 14 at their meeting ends. At their opposite ends, the said links are respectively pivoted to said disks 9, 10 by pins 14', 14' and 15, 15 respectively.

The disks 9, 10 with links 11, 11, 12, 12 constitute a governor. When the motor is not running, the coiled spring 16 that surrounds the shaft 4 between the disks 9, 10 moves the disk 10 toward the right, viewing Figs. 1, 3 and 4. When, however, the motor is running, links 11, 11, 12, 12 gradually move outward under centrifugal force and against the action of the coiled spring 16, thus moving the disk 10 toward the left,—that is, into or toward the position shown in Fig. 4.

The material that is being acted upon, as, for example, by being wound into a package or fed to the needles of a knitting machine, comes from a suitable source of supply and is indicated, for example, at 17 in Figs. 1 and 8. Said material may be of any suitable nature, but is of strand form, and is usually of textile material. The mechanism, however, may be employed in winding such metallic articles as fine copper wire, etc.

Referring more particularly to Figs. 1, 5 and 8, the strand to be manipulated as desired passes through the eye 18 of a stationary guide arm 19, which may be supported upon any suitable part, as, for example, at 20 upon the arm 21 of an angular member pivoted at 22, and receiving for rotation a gear 23, the teeth 24 whereof are or may be of non-metallic material, and meshing more or less deeply according to desired regulation, with the teeth 25 of a gear 26 fast upon the shaft of the electric motor 2. The teeth of the gears 23 and 26 may be of rawhide or other suitable material to receive and feed the strand 17 coming from the source of supply, in a downward direction viewing Figs. 1 and 8. After being fed between the teeth of said gears 23, 26, the strand 17 engages a strand receiving formation 27 (here shown as an eye) at one end of an arm or member 28 connected at 29 to a lever 30, which is itself pivoted at 31 upon the hub or part 5. The said lever 30, or the necessary part thereof, is of insulating material and has fastened thereto two springy metallic arms constituting contact members 32, 33. These said contact members are respectively secured to the lever arm 30 by screws 34, 35. As shown most clearly in Fig. 2, to the screw 35 is connected the wire 36 forming part of the circuit and connected to a suitable part of the electric motor 2, as indicated at 37. From the other screw 34 extends a wire 38 of the circuit which is connected to the wire 6 by means of the post 39. From the companion post 40, to which the wire 7 is connected, there extends a wire 41 that is connected to a suitable part of the electric motor 2, as indicated at 42 in Fig. 2.

It will be observed from the construction thus far described that the circuit, which is traced through the wires or elements 6, 39, 38, 34, 35, 36, 37, 42, 41, 40 and 7, cannot be completed (even after the plug 8 has been properly inserted in the socket connected to a source of power), until the two contacts 32, 33 are brought together. The motor therefore will not begin to run even after the plug 8 has been inserted in its socket, until the said two contacts 32 and 33 are brought together and the motor will stop or begin to slow down as soon as the said two contacts 32, 33 are permitted to spring apart.

The strand-like material, of whatever character and for whatever purpose, passes through or in relation to the strand receiving formation or eye 27 of the arm or member 28. The said arm or member 28, viewing the arrangement of parts shown in Fig. 1, moves (that is, is drawn) upward by the increased tension of the strand-like material 17 shown in this figure as passing downward from some suitable source of supply and thence upward to the mechanism where it is to be acted upon in some way.

The said arm or member 28 is, as stated, secured at 29 to the lever 30 pivoted at 31 on the part or hub 5, and carrying the two springy contacts 32, 33. It may be assumed that the motor 2 is now in a position of rest and the operator, desiring to start the operation of the parts, inserts a plug 8 so as to connect to a source of power, and permits the mechanism, whatever it may be, that is drawing upon the strand 17, to do so in such a direction as to move the arm 28 slightly upward from the position shown in Fig. 1. The effect of this action is to swing the lever 30 upon its pivot 31 in a contra-clockwise direction until the contact member 32 abuts against the face of the disk 10. Such movement is continued until the now stationary contact member 32 is itself contacted by the other contact member 33. This fact completes the circuit shown in Fig. 2 and the motor 2 thereupon commences to run and its speed may increase in the usual manner until it gets up to speed if permitted to do so. Under the influence of such increasing speed, the links 11, 11, 12, 12 of the governor commence to open out into or toward the position shown in Fig. 4, thus drawing the disk 10 with them toward the left viewing Fig. 1. The tension condition of the strand 17 will determine whether the arm 28 will be moved further upward so that the two contact members 32, 33 will continue to move toward the left in Fig. 1, so as again to move into contact with the disk 10 of the governor, or whether the arm or member 28 will begin to move downward when the contact members 32, 33 thus become separated so that the circuit is broken and the motor stopped or its speed is reduced.

It is obvious that the to and fro motion of the arm 28 under the tension of the strand-like material acts to cause the motor to run or to stop or slow down, and the movements of the arm 28 in one direction or the other serve in a quickly responsive manner to cause the motor so to function that the strand 17 will be delivered at a uniform tension to the point where it is to be acted upon. That is to say, the irregularities in the feeding conditions of the strand 17 due to whatever cause, whether the same be in the nature of the machine that is acting upon the strand, to wind or knit the same, or whether the same is because of necessary irregularities in the delivery of the strand from the original package, are utilized to compel an essentially regular and even delivery of the strand to its place of use. The arm 28 is perfectly free to move. The said arm causes a loop to be formed in the strand, and, of course, as further strand is needed by the mechanism using it, the strand is drawn first of all from the said loop therein. Inasmuch as the arm 28 swings from a pivot that is a substantial distance from a vertical line drawn through the loop of the strand that is being delivered downwardly and does not swing into a vertical position, and inasmuch as the said arm 28 is extremely light, the torque exerted on the strand is substantially uniform providing that there is no mechanical work for the arm 28 to do. As a matter of fact, there is no mechanical work for the said arm 28 to do, since it merely rotates or swings a switch-like element, namely, the switch members 32, 34, which switch causes the motor to run faster or slower, thus delivering more or less strand depending entirely upon the position of the arm 28. In other words, the motor is capable of running fast enough so that there will always be a loop of strand between the motor and the point of use of the strand. Within this loop of strand, there exists a uniformly weighted element, namely, the arm 28, which causes a light amount of tension against the said loop regardless of whether the loop is big or small. In this manner enough tension is obtained on the strand.

If desired, I may provide means to adjust or vary the relation of the two gears 23, 26 between which the strand 17 is fed or delivered to the arm or member 28. For this purpose, I have shown in Figs. 5 and 6 two adjusting screws 43, 44. The screw 43 is tapped, as shown, into the base block 1, and the screw 44, when the screw 43 has been passed into the base 1 in correct position, is then turned until it comes solidly at 45 against the top face of the base 1.

The switch herein shown as exemplified by the members 32, 33, is shown by way of example only. It may be of any suitable type, as, for example, a mercoid switch operated by a magnet. In employing a switch such as here shown, I may quench the spark at the switch in any suitable manner, as by the use of capacitance or capacity. The governor may be of any suitable type, as, for example, one in which the disk 10 would be of a magnetic nature. Any suitable mechanism by which the steps of my method may be carried out, may be employed by me. The essential purpose of my invention is to control accurately the speed of an electric motor by positioning a switch (herein exemplified by the members 32, 33), which switch will then be acted on by a mechanism that will throw the switch on or off, depending on the speed of the motor, with the result that the switch may be positioned with the slightest touch or application of some outside physical force.

I am aware that heretofore the speed of an electric motor has been changed by acting on a part of the governor, but this requires the application of very considerable power or force. I am, on the contrary, changing the speed of the motor through the application of very slight physical force.

There are many advantages in the use of my invention particularly in controlling the feed of strand-like material, the tension of which may or does vary. For example, in the feeding of bare rubber, because of the tendency of the adjacent turns of the rubber strand to stick together upon the supply package, the rubber may stretch from one to seven times its length, with consequent very great or very substantial changes in the position of the switch, and therefore of the action of the governor. That is, it may be necessary to draw off seven inches of rubber strand to obtain one inch, or to draw off merely inch for inch. Thus the power required of the motor varies or may vary greatly. I am enabled in the practice of my invention to take care of variations from one to fifty units in the rate of feed of the machine by causing the motor to act at the appropriate speed for each variation in the feed of the strand or the like. In winding thread or other strands, there may be a marked variation or change in ratio in the feed of the material, as, for example, from one to four.

In numerous other uses, there is or may be present or exerted very slight force, but that can, in the practice of my invention, be used to get more power from the motor, through the positioning of the switch. I obtain a very exact change of speed of a motor through a governor from a very small source of power.

While I have described the contact member 32 as, under certain conditions, abutting directly against the face of the disk 10, so as to close the switch, it is to be understood that my invention is not limited to any construction wherein direct contact is made with the disk 10 or its equivalent by a contact member. Many changes within the scope of my invention may be made, and I may employ any suitable construction to reduce to a minimum or eliminate any vibration that might tend to be imparted to the arm or member 28 in the action of the governor. For example, I may attach to the outer face of the disk 10 or the like a metal sleeve which moves along the shaft 4 with the governor. Such metal sleeve may be provided upon a fibre or like barrel, which is also attached to the governor, which fibre would at times be contacted by a strip or brush connected with the arm or member 28. So long as such strip or brush is in contact merely with the fibre, the motor is not started, but as soon as the said strip or brush comes in contact with the metal sleeve, and even before it has completely left the fibre barrel, the motor is started. Under such circumstances, the governor moves back and forth, and the only force that can possibly re-act against the arm or member 28 is the extremely light friction due to the strip or brush resting against the rotating fibre barrel. With the parts so constructed and arranged, there is no vibration of the arm or member 28 incident merely to the action of the governor or motor.

I may in any suitable manner cause the current in the motor to act as an electric brake so that if the strand 17 is stopped quickly and the arm or member 28 tends to drop more quickly than the motor can stop, the result is to provide a braking current for the motor, thereby stopping it very quickly.

Having thus described one illustrative example of a practical use of the invention and the method of operation thereof, it is to be understood that although specific terms are employed, they are used in a generic and descriptive sense and not for purposes of limitation, the scope of the invention being set forth in the following claims.

I claim:

1. Means for controlling the feeding of material for textile and other purposes comprising in combination, an electric motor having motor speed-altering means operatively connected thereto, a to and fro movable member having a formation for guiding a strand from a source of supply to a mechanism for further action, a set of strand-feeding rotatable members to engage the said strand between them, and thereby to feed the strand to such mechanism, one at least of said feeding members being driven by said motor, said guide member being movable in response to tension changes in said strand, and being operatively connected to said motor speed-altering means, whereby the tension of the strand material upon said guide member controls the running condition of the motor, and thereby controls the feeding of the strand between said feeding rotatable members.

2. Means for controlling the feeding of material for textile and other purposes comprising in combination, an electric motor having motor speed-altering means operatively connected thereto, a to and fro movable member having a formation for guiding a strand from a source of supply to a mechanism by further action, a set of strand-feeding, rotatable members to engage the strand between them, and thereby to feed the strand, one of said feeding means being driven by said motor, said strand-guiding member being movable to and fro in response to tension changes in said strand that is being fed and being operatively connected to said motor speed-altering means, whereby the tension of said strand material upon said member speeds up or slows down the said motor, and thereby controls the feeding of said strand by said strand-feeding rotatable members.

3. Means for controlling the feeding of material for textile and other purposes comprising in combination, a member having a strand-receiving formation adapting it to receive the strand from a source of supply and to guide it to mechanism where it is to be further acted upon, said member having a to and fro motion under the tension of the strand at said formation, an electric motor, an electric circuit for the motor including contacts controlling said circuit and adapted to be relatively moved by the movements of said member under tension changes of said strand to open or close the circuit, and governor means for said motor with which said contacts co-act to act as an abutment to close the contacts and so to drive the motor or to withdraw from abutment-acting position, for slowing down or stopping the motor, whereby the tension of the strand controls the running of the motor.

4. Means for controlling the feeding of material for textile and other purposes comprising in combination, a member having a strand-receiving formation adapting it to receive the strand from a source of supply and to guide it to mechanism where it is to be further acted upon, said member having a to and fro motion under the tension of the strand at said formation, an electric motor, an electric circuit for the motor including contacts controlling said circuit and adapted to be relatively moved by the movement of said member under tension changes of said strand to open or close the circuit, a movable member carrying said contacts and operatively connected with the member having the strand-receiving formation, and governor means for said motor with which said contacts co-act as an abutment to close the contacts and so to drive the motor or to withdraw from abutment-acting position, for slowing down or stopping the motor, whereby the tension of the strand controls the running of the motor.

5. Means for controlling the feeding of material for textile and other purposes comprising in combination, a member having a strand-receiving formation adapting it to receive the strand from a source of supply and to guide it to mechanism where it is to be further acted upon, said member having a to and fro motion under the tension of the strand at said formation, an electric motor, an electric circuit for the motor including contacts controlling said circuit and adapted to be relatively moved by the movement of said member under tension changes of said strand to open or close the circuit, and a governor mounted upon the electric motor and having a member positioned substantially radially of and movable in a direction axially of the shaft of the motor and acting as an abutment to control the engaging or non-engaging of the said contact members.

6. Means for controlling the feeding of material for textile and other purposes comprising in combination, a member having a strand receiving-formation adapting it to receive the strand from a source of supply and to guide it to mechanism where it is to be further acted upon, said member having a to and fro motion under the tension of the strand at said formation, an electric motor, an electric circuit for the motor including contacts controlling said circuit and adapted to be relatively moved by the movement of said member under tension changes of said strand to open or close the circuit, a pivoted lever upon which said contacts are mounted, said lever being connected to the member having the strand-receiving formation, and a governor carried by the motor and adapted to open under centrifugal action and having a part constituting an abutment to control the engaging and disengaging of the contacts.

7. That method of obtaining a substantially uniform and even feed of strand material through accurately controlling the speed of a small-power electric motor by which said material is fed and which motor has in circuit therewith a controlling switch and is provided with a governor—which comprises utilizing the slight force of inevitable irregularities in the tension of the said strand that is fed by said motor, to move the switch and, through such movement of the switch, to alter the action of the governor and consequently to change the speed of the said motor.

8. Means for maintaining a substantially uniform and even feed of strand material and for utilizing the slight inevitable irregularities in tension of said feeding strand material to vary the speed of the electric motor that controls the feeding of said material, comprising, in combination, a small-power electric motor therefor, a governor therefor, an electric switch in circuit with the motor and the functioning of which switch speeds up said motor and thereby affects the operation of said governor, rotary strand-feeding means driven by said motor and the speed of which feeding means is determined by the speed of the motor, and movable means engaging said feeding strand material between said feeding means and the point of use of said strand, and the movement of which movable means is determined by the tension of the said feeding strand material, said movable means being operatively connected to said electric switch to move the latter and thereby cause it to function.

9. Means for controlling accurately the speed of an electric motor, comprising an electric motor, a governor therefor, an electric switch in circuit with the motor, movable means for guiding strand-like material to a place of use, and responsive in movement to changes in tension of the strand-like material, said electric switch being connected to said movable means to be positioned by said movements of said movable means, said governor serving as an abutment to be engaged by said switch as positioned by said movable means, to open or close the switch, and thereby to control the speed of the motor.

10. Means for controlling accurately the speed of an electric motor, comprising an electric motor, a governor therefor, an electric switch in circuit with the motor, movable means for guiding strand-like material to a place of use, and responsive in movement to changes in tension of the strand-like material, said electric switch being connected to said movable means to be positioned by said movements of said movable means, said governor serving, when stationary, as an abutment to cause the closing of the switch upon positioning of the same through the tension of the strand-like material, and through its resulting movement due to the closing of the switch, to increase the speed and power of the motor.

11. Means for controlling accurately the speed of an electric motor, comprising an electric motor, a governor therefor, an electric switch in circuit with the motor, movable means for guiding strand-like material to a place of use, and responsive in movement to changes in tension of the strand-like material, said electric switch being connected to said movable means to be positioned by said movements of said movable means, said governor being responsive to centrifugal force when the motor circuit is closed, and having a part acting as an abutment to be engaged by said switch when positioned, thereby to control the speed of the motor.

12. Means for controlling the feeding of material for textile and other purposes comprising in combination, a member having a strand-receiving formation adapting it to receive the strand from a source of supply and to guide it to mechanism where it is to be further acted upon, said member having a to and fro motion under the tension of the strand at said formation, an electric motor, an electric circuit for the motor including contacts controlling said circuit and adapted to be relatively moved by the movements of said member under tension changes of said strand to open or close the circuit, and governor means for said motor co-acting with said contacts to effect the closing thereof, so as to drive the motor.

13. Means for controlling the feeding of material for textile and other purposes comprising in combination, a member having a strand-receiving formation adapting it to receive the strand from a source of supply and to guide it to mechanism where it is to be further acted upon, said member having a to and fro motion under the tension of the strand at said formation, an electric motor, an electric circuit for the motor including contacts controlling said circuit and adapted to be relatively moved by the movement of said member under tension changes of said strand to open or close the circuit, and a governor mounted upon the electric motor and having means movable in a direction axially of the shaft of the motor to control the opening and closing of the circuit through said contact members.

14. Means for controlling the feeding of material for textile and other purposes comprising in combination, a member having a strand-receiving formation adapting it to receive the strand from a source of supply and to guide it to mechanism where it is to be further acted upon, said member having a to and fro motion under the tension of the strand at said formation, an electric motor, an electric circuit for the motor including contacts controlling said circuit and adapted to be relatively moved by the movement of said member under tension changes of said strand to open or close the circuit, a lever upon which said contacts are mounted, said lever being connected to the member having the strand-receiving formation, and a governor carried by the motor and adapted to open under the influence of centrifugal action and in so doing to control the circuit through said contacts.

15. Means for controlling accurately the speed of an electric motor, comprising an electric motor, a governor therefor, an electric switch in circuit with the motor, movable means for guiding strand-like material to a place of use, and responsive in movement to changes in tension of the strand-like material, said electric switch being operatively connected to said movable means so as to be positioned for opening or closing by said movements of said movable means, said governor having co-acting means serving as an abutment co-acting with said switch, whereby the switch is opened or closed.

16. Means for controlling accurately the speed of an electric motor, comprising an electric motor, a governor therefor, an electric switch in circuit with the motor, movable means for guiding strand-like material to a place of use, and responsive in movement to changes in tension of the strand-like material, said electric switch being operatively connected to said movable means so as to be positioned for opening or closing by said movements of said movable means, said governor serving as an abutment co-acting with said switch, when stationary, to cause the closing of the switch upon positioning of the same through the tension of the strand-like material, and thereby effecting increase in the speed and power of the motor.

17. Means for controlling accurately the speed of an electric motor, comprising an electric motor, a governor therefor, an electric switch in circuit with the motor, movable means for guiding strand-like material to a place of use, and responsive in movement to changes in tension of the strand-like material, said electric switch being operatively connected to said movable means so as to be positioned for opening or closing by said movements of said movable means, said governor being responsive to centrifugal force when the motor circuit is closed, and serving as an abutment co-acting with said switch, thereby acting to control the speed of the motor.

18. Means for maintaining a substantially uniform and even feed of strand material and for utilizing the slight inevitable irregularities in tension of said feeding strand material to vary the speed of the electric motor that controls the feeding of the strand material, comprising, in combination, an electric motor, a governor therefor, an electric switch in circuit with the motor and the functioning of which switch varies the speed of said motor and thereby affects the operation of said governor, strand-feeding means driven by said motor and the speed of which feeding means is determined by the speed of the motor, and movable means engaging said feeding strand material and the movement of which movable means is determined by the tension of the feeding strand material, said movable means being operatively connected to said electric switch, and thereby causing it to function.

ROBERT H. LAWSON.

CERTIFICATE OF CORRECTION.

Patent No. 2,227,356. December 31, 1940.

ROBERT H. LAWSON.

It is hereby certified that error appears in the printed specification of the above numbered patent requiring correction as follows: Page 1, first column, line 2, after "changing" insert the words --by slight physical force--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.